July 26, 1955  H. E. POUELL  2,714,039
WHEEL BALANCE WEIGHT CONSTRUCTION
Filed July 10, 1950
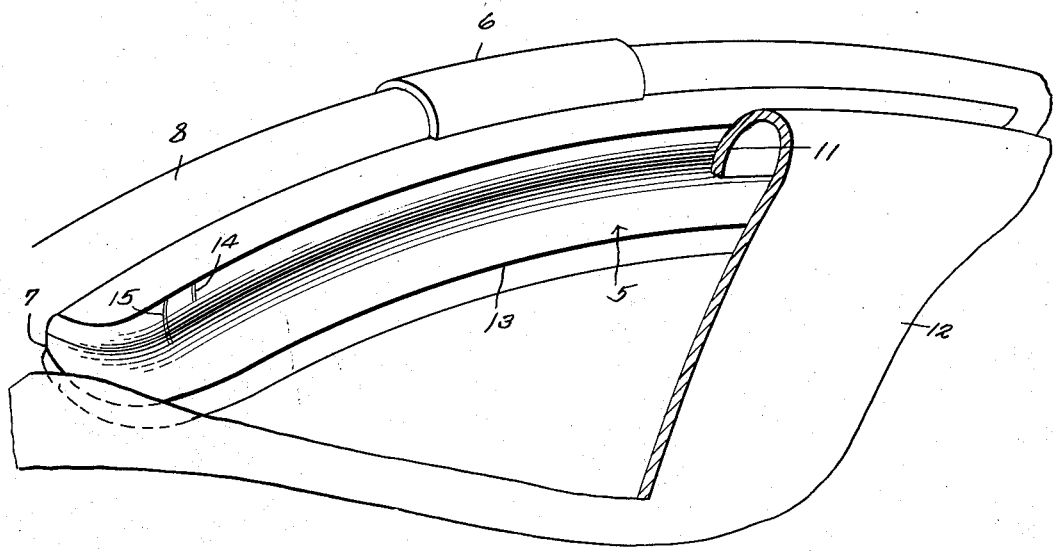
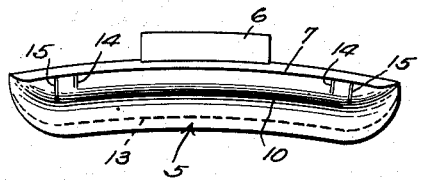
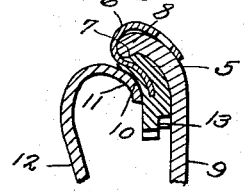
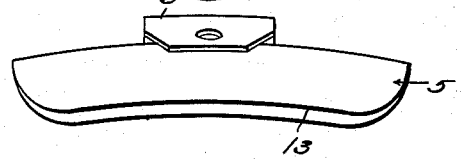
H. E. Pouell
INVENTOR
BY *C. A. Snow & Co.*
ATTORNEYS.

2,714,039

WHEEL BALANCE WEIGHT CONSTRUCTION

Harry E. Pouell, Kokomo, Ind.

Application July 10, 1950, Serial No. 172,810

1 Claim. (Cl. 301—5)

This invention relates to motor vehicle wheel balancing weight construction, the primary object of the invention being to provide a universal wheel balancing weight which may be effectively fitted on the conventional type of motor vehicle wheels, eliminating the necessity of providing a weight of a particular construction for use on a rim of a particular type.

An important object of the invention is to provide a wheel balancing weight having longitudinally disposed grooves arranged to provide a smooth and regular fit between the rim on which the weights are positioned, and the balancing weight and hub cap, to insure against accidental displacement of the weight from the wheel on which it is mounted.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

Referring to the drawing,

Figure 1 is an enlarged perspective view illustrating a balancing weight constructed in accordance with the invention, and mounted on a conventional motor vehicle wheel, a portion of the hub cap being cut away illustrating the weight in position.

Fig. 2 is a side elevational view of a balancing weight, constructed in accordance with the invention.

Fig. 3 is a sectional view through the central portion of a balancing weight, illustrating the weight as mounted on a wheel rim with a hub cap engaging therewith.

Fig. 4 is a view of the opposite side of the balancing weight as shown by Fig. 2.

Referring to the drawing in detail, the reference character 5 indicates the body portion of the wheel balancing weight, which is longitudinally curved to conform to the curvature of the usual motor vehicle wheel rim on which the weight is positioned.

As shown, the body portion is provided with the usual spring clip 6 which extends upwardly and rearwardly over the upper edge of the weight so that the clip may be positioned over the edge of a wheel rim to firmly clamp the wheel rim and hold the weight in position.

Formed in the upper edge of the body portion, is the groove 7 which is so constructed that it receives the bead 8 of the wheel rim 9, the inner edge of the body portion 5 resting squarely against the outer surface of the rim at its periphery.

The outer surface of the body portion or weight 5 is curved at 10 to receive the curved flange 11 of the wheel cover 12 which is used with the wheel.

The lower edge of the weight is formed with a longitudinally disposed cut away portion 13, adapting the weight for fitting over the edge of a chrome trim of a hub cap, to provide a close fit.

The reference characters 14 and 15 indicate graduated lines in fractions of ounces, the lines indicating portions of the weight to be cut away should it be desired to decrease the length and weight of the body portion to adapt it for balancing a particular wheel.

From the foregoing it will be seen that due to the construction shown and described, the weight forming the subject matter of the present invention is so constructed and arranged that it is applicable for use in connection with conventional type of rims and hub caps, eliminating the necessity of providing a weight of a particular construction to be used in connection with a conventional type of rim.

Having thus described the invention, what is claimed is:

The combination with a motor vehicle wheel rim having an annular bead at its peripheral edge presenting a curved surface, and a wheel cover secured thereto, of a wheel balancing weight comprising a body curved in the arc of a circle fitted against said curved surface and said annular bead of said rim, said body having a groove extending throughout the length thereof and disposed in the outer surface of the body in which the curved edge of said wheel cover is held, a spring clip extending beyond the edge of the body at a point intermediate the ends thereof, said spring clip being extended rearwardly to clip over the edge and head of said wheel rim, and the lower inner edge of said body being cut away providing a stop against which the edge of a wheel rim chrome ring may rest.

References Cited in the file of this patent

UNITED STATES PATENTS

| | | |
|---|---|---|
| D. 161,006 | Dailey | Nov. 28, 1950 |
| 2,065,633 | Van Halteren | Dec. 29, 1936 |
| 2,122,064 | Hume | June 28, 1938 |
| 2,122,065 | Hume II | June 28, 1938 |
| 2,345,283 | Mulhern | Mar. 28, 1944 |
| 2,361,406 | Lyon | Oct. 31, 1944 |
| 2,386,227 | Lyon II | Oct. 9, 1945 |
| 2,522,024 | Englehart | Sept. 12, 1950 |